United States Patent
Otto et al.

(10) Patent No.: US 11,648,980 B2
(45) Date of Patent: May 16, 2023

(54) STEERING SYSTEMS USE AND FAILURE MONITORING

(71) Applicant: STEERING SOLUTIONS IP HOLDING CORPORATION, Saginaw, MI (US)

(72) Inventors: Jeffrey M. Otto, Auburn, MI (US); Michael A. Eickholt, New Lothrop, MI (US); Josiah G. Ward, Auburn, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 1051 days.

(21) Appl. No.: 16/399,274

(22) Filed: Apr. 30, 2019

(65) Prior Publication Data

US 2020/0346688 A1 Nov. 5, 2020

(51) Int. Cl.
 *B62D 5/04* (2006.01)
 *B62D 15/02* (2006.01)
 *B60W 50/04* (2006.01)
 *B60W 50/00* (2006.01)

(52) U.S. Cl.
 CPC ......... *B62D 5/0481* (2013.01); *B60W 50/045* (2013.01); *B62D 15/021* (2013.01); *B60W 2050/0005* (2013.01)

(58) Field of Classification Search
 CPC ............................ B60W 50/045; B62D 5/0481
 See application file for complete search history.

(56) References Cited

U.S. PATENT DOCUMENTS

| | | | | |
|---|---|---|---|---|
| 9,776,657 | B1* | 10/2017 | Badiru | B62D 6/006 |
| 2005/0045165 | A1* | 3/2005 | Iwatsuki | F02P 3/0435 |
| | | | | 123/625 |
| 2017/0144698 | A1 | 5/2017 | Bourdrez et al. | |
| 2020/0079422 | A1* | 3/2020 | Wijffels | B62D 15/02 |
| 2022/0148342 | A1* | 5/2022 | Fagergren | B60W 50/10 |

(Continued)

FOREIGN PATENT DOCUMENTS

| | | |
|---|---|---|
| CN | 105424356 A | 3/2016 |
| CN | 105900146 A | 8/2016 |
| CN | 106163903 A | 11/2016 |

(Continued)

OTHER PUBLICATIONS

Office Action regarding corresponding CN App. No. 202010355247.0; dated Mar. 24, 2022.

*Primary Examiner* — Jess Whittington
(74) *Attorney, Agent, or Firm* — Dickinson Wright PLLC (57) ABSTRACT

A method to determine, in real time, a use-life of a steering system includes tracking an attribute signal associated with the steering system. The method further includes, based on a determination that the attribute signal rises above an upper threshold and subsequently falls below a lower threshold, selecting a subset of categories based on a frequency content of the attribute signal. The method further includes selecting a category from the subset of categories based on a peak load occurring in sequence to the attribute signal via a secondary attribute signal. The method further includes incrementing a counter for the selected category. The method further includes computing the use-life based on a ratio of the counter for the selected category and a predetermined count for said selected category.

12 Claims, 9 Drawing Sheets

(56) References Cited

U.S. PATENT DOCUMENTS

2022/0250583 A1\* 8/2022 Garg .................... B60R 25/102

FOREIGN PATENT DOCUMENTS

| CN | 107533330 | A | 1/2018 |
| CN | 108327721 | A | 7/2018 |
| JP | 2016159766 | A | 9/2016 |
| KR | 20120134555 | A | 12/2012 |

\* cited by examiner

STEERING SYSTEMS USE AND FAILURE MONITORING

BACKGROUND

An electric power steering (EPS) typically includes components such as steering wheel, column, rack-pinion gear, electric motor actuator etc. The EPS helps the operator to steer a vehicle by providing necessary assist torque. The assist torque is based on operator's applied torque. In a steady-state sense, the operator torque and assist torque counter the rack force generated because of tire-road interaction.

A typical Steer by wire (SbW) system includes a road-wheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the operator. Alternatively, the handwheel angle and vehicle speed can also be used to generate desired torque feel to the operator. The angle from HWA unit is sent to the RWA unit which performs position control to control rack travel.

SUMMARY

According to one or more embodiments, a steering system includes a motor, a controller, and a monitoring system that further includes at least a memory device and a processor. The monitoring system is coupled with the controller and determines, in real time, a use-life of the steering system. Determining the use-life is performed using a method that includes tracking an attribute signal. The method further includes, based on a determination that the attribute signal rises above an upper threshold and subsequently falls below a lower threshold, selecting a subset of categories based on a frequency content of the attribute signal. The method further includes selecting a category from the subset of categories based on a peak load occurring in sequence to the attribute signal via a secondary attribute signal. The method further includes incrementing a counter for the selected category. The method further includes computing the use-life based on a ratio of the counter for the selected category and a predetermined count for said selected category.

According to one or more embodiments, a method to determine, in real time, a use-life of a steering system includes tracking an attribute signal associated with the steering system. The method further includes, based on a determination that the attribute signal rises above an upper threshold and subsequently falls below a lower threshold, selecting a subset of categories based on a frequency content of the attribute signal. The method further includes selecting a category from the subset of categories based on a peak load occurring in sequence to the attribute signal via a secondary attribute signal. The method further includes incrementing a counter for the selected category. The method further includes computing the use-life based on a ratio of the counter for the selected category and a predetermined count for said selected category.

According to one or more embodiments, a computer program product includes a memory storage device having computer executable instructions stored therein, the computer executable instructions when executed by a processing unit cause the processing unit to determine, in real time, a use-life of a steering system. Determining the use-life of the steering system includes performing a method that includes tracking an attribute signal associated with the steering system. The method further includes, based on a determination that the attribute signal rises above an upper threshold and subsequently falls below a lower threshold, selecting a subset of categories based on a frequency content of the attribute signal. The method further includes selecting a category from the subset of categories based on a peak load occurring in sequence to the attribute signal via a secondary attribute signal. The method further includes incrementing a counter for the selected category. The method further includes computing the use-life based on a ratio of the counter for the selected category and a predetermined count for said selected category.

These and other advantages and features will become more apparent from the following description taken in conjunction with the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for tracking usage with sensor inputs and understanding the amount relative to design intent.

The steering system helps the operator to steer a vehicle by providing necessary torque assist. Today, a modern steering system typically includes components such as steering wheel, column, rack-pinion gear, electric motor actuator etc. The assist torque is based on operator's applied torque. In a steady-state sense, the operator torque and assist torque counter the rack force generated because of tire-road interaction.

Figure 1:
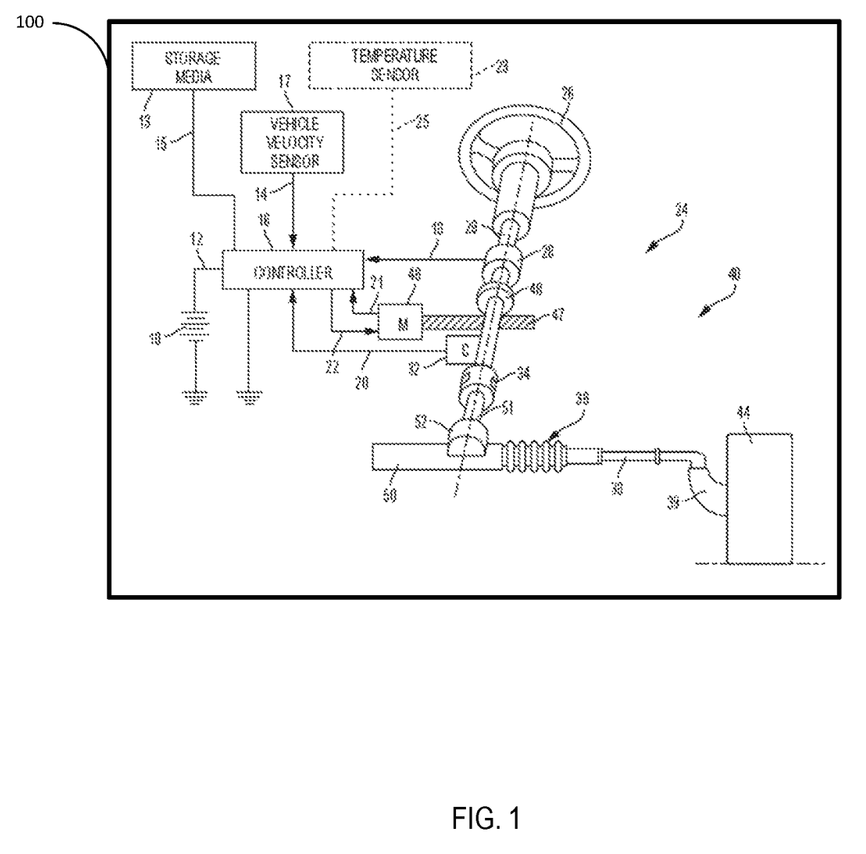
FIG. 1 depicts an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. It should be noted that although a rack-and-pinion type system is depicted as an example herein, the technical solutions described herein is applicable to any type of EPS such as rack based, column based, pinion based etc. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown).

Electric power steering assist is provided through the control apparatus generally designated by reference numeral 24 and includes the controller 16 and an electric machine 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position $\theta$ as measured by a position sensor 32 over a prescribed time interval. For example, motor speed $\omega_m$ may be determined as the derivative of the motor position $\theta$ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the hand wheel 26 is turned, torque sensor 28 senses the torque applied to the hand wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position $\theta$. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
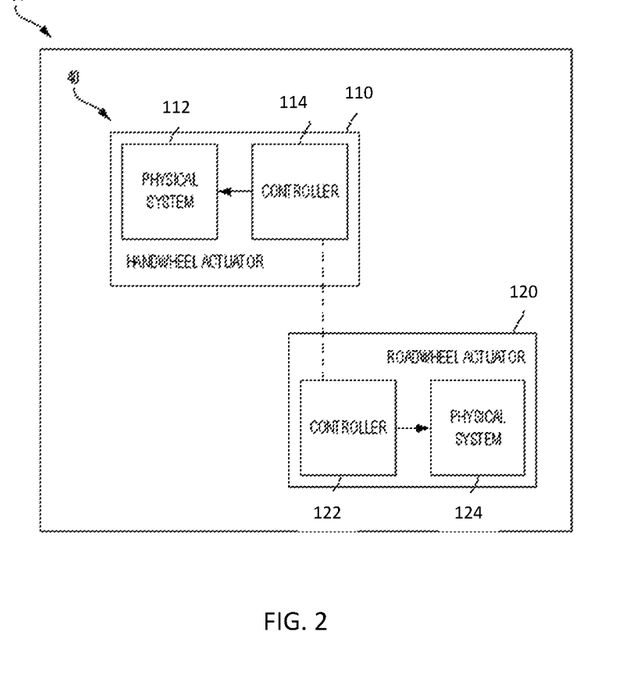
FIG. 2 is an exemplary embodiment of a steer by wire steering system according to one or more embodiments.

A different type of a steering system, particularly a steer by wire steering (SbW) system 40 in a vehicle 100 is depicted in FIG. 2. It will be appreciated that the SbW system 40 shown and described can be used in an autonomous or semi-autonomous vehicle or in a more conventional vehicle. The SbW system 40 includes a handwheel actuator (HWA) 110 and a roadwheel actuator (RWA) 120.

The HWA 110 includes one or more mechanical components 112, such as a handwheel (steering wheel), a steering column, a motor/inverter attached to the steering column either through a gear mechanism or a direct drive system. The HWA 110 further includes a microcontroller 114 that controls the operation of the mechanical components 112. The microcontroller 114 receives and/or generates torque via the one or more mechanical components 112.

The RWA includes one or more mechanical components 124, such as a steering rack and/or pinion coupled to a motor/inverter through a ball-nut/ball-screw (gear) arrangement, and the rack is connected to the vehicle roadwheels/tires through tie-rods. The RWA 120 includes a microcontroller 124 that controls the operation of the mechanical components 124. The microcontroller 122 receives and/or generates torque via the one or more mechanical components 124.

The microcontrollers 112 and 122 are coupled through electrical connections that allow signals to be transmitted/received. As referred to herein, a controller can include a combination of the HWA controller 112 and the RWA controller 122, or any one of the specific microcontrollers. The microcontrollers 112 and 122 can be the same as the controller 16 described herein.

In one or more examples, the controllers 112 and 122 SbW system 40 communicate with each other through CAN interface (or other similar digital communication protocols). Guidance of the vehicle 100 that is fitted with the SbW system 40 is performed by use of the steering gear, with an input shaft that is rotated by the RWA 120, such as a servo actuator. The RWA 120 receives an electronic communication signal of rotation of the steering wheel by the operator. An operator controls the steering wheel to directionally control the vehicle 100. The angle from HWA 110 is sent to the RWA 120 which performs position control to control rack travel to guide the roadwheel. However, due to the lack of mechanical connection between the steering wheel and the road wheels, the operator is not provided with a feel for the road without torque feedback (unlike the case in an EPS as described earlier).

In one or more examples, the HWA 110 that is coupled to the steering column and steering wheel simulates the operator's feel of the road. The HWA 110 may apply tactile feedback in the form of torque to the steering wheel. The HWA 110 receives a rack force signal from the RWA 120 to generate an appropriate torque feel for the operator. Alternatively, the handwheel angle and vehicle speed can also be used to generate desired torque feel to the operator.

It should be noted that hereon further, a steering system 40 can refer to an EPS system or an SbW system as described herein, and the technical solutions described herein are applicable to either type of steering systems.

With the increased use of electrical components and communication in place of mechanical linkages in the steering system, driver's input (either in direct mechanical connection (SbW) or control (ADA)) to the roadwheel is removed/replaced with an electrical communication link. Although such technology is an enabler of (but not limited to): package freedom, new safety mechanisms and flexibility; it also removes some of the sense of driver perception which previously was transmitted through the mechanical linkage to the driver.

Consider a mechanical based steering system which slowly degrades over time. As components wear past their designed validation life, the manufacturer depends on the human driver's perceptions as a detection mechanism to prevent catastrophic failure modes that may occur after the perceptive warning. Lash developing between threaded interfaces, or moving parts wearing to create increased levels of friction eventually lead to noise or heavy feel that is detected by the operator and in turn leads to a service call. Now consider the road wheel actuator of a SbW system 40 or ADA system where these failures will be either rejected as a disturbance by the position control mechanism, masked by other under hood running noises or isolated away with compliant mounting bushings. Accordingly, a technical challenge exists to monitor the various components of a steering system for their respective use and failure. It will be appreciated that such technical challenge can exist in mechanical based steering systems as well where the operator fails to sense the wear of the components.

The technical solutions described herein address such technical challenges by using a structure of cycle counters and event monitors to track the usage and operating environment of the steering system over time. Correlation between these counted cycles and that of a predetermined validation plan is leveraged to create an active warning to the driver that an operating space beyond the validation plan is presently occurring (increased chance of failure). The event monitoring component can also be used to interrogate returned material for failure modes that might be a function of a specific use case (e.g. heavy right turns) or specific environment (e.g. extreme cold weather). Event monitoring data can also be leveraged to authenticate whether the counted cycles are valid based on vehicle usage.

Figure 3:
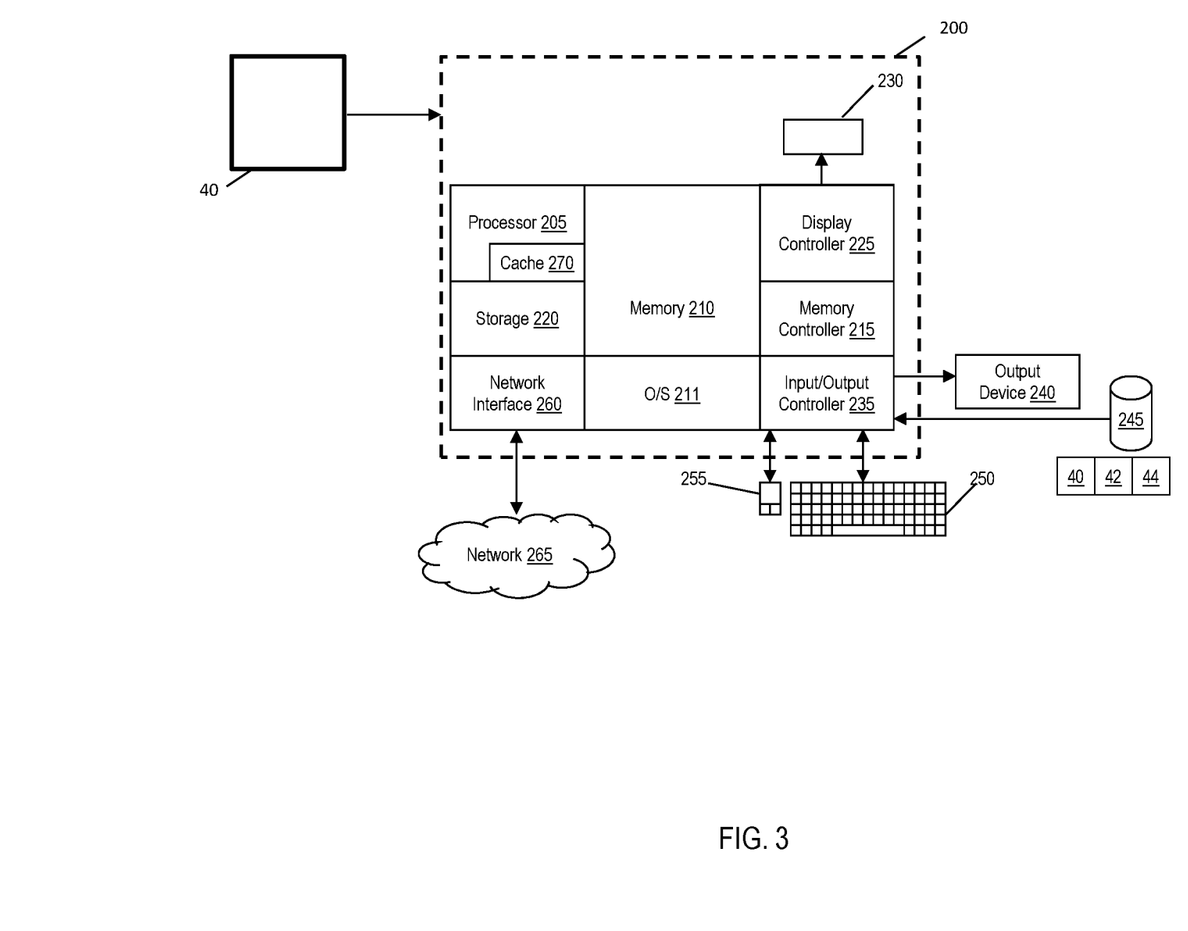
FIG. 3 illustrates an example system for monitoring use and failure of steering systems according to one or more embodiments.

FIG. 3 illustrates an example system for monitoring use and failure of steering systems according to one or more embodiments. The system 200 may be an electronic circuit that includes a processor and a memory among other components, the electronic circuit being in communication with one or more processors and components of the steering system 40. In one or more examples, the system 200 can be a portable computing device that can communicate with the steering system in a wireless or a wired manner.

The system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In an embodiment, the external system may be another aerial drone or a drone docking system, wherein the transmitting and receiving of data allows the system 200 to identify the other drone or docking system and determine when the payload is to be transferred to the other drone. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a controller area network (CAN), a virtual private network (VPN), intranet or other suitable network system and may include equipment for receiving and transmitting signals The monitoring system 200 tracks use and life of the steering system 40 using position based cycle counting within the steering system 40 by monitoring one or more parameters. As indicated earlier, the steering system 40 can be an EPS system or one or more actuators in case of an ADAS EPS or SbW system 40. In one or more examples, the monitoring system 200 can monitor and keep track of position cycles to account for varying levels of usage based wear. The monitoring system can distinguish high and low frequency content in the position cycles. Further, the monitoring system 200 can distinguish high and low load situations based on motor torque and keep track of the position cycles in conjunction with the load at that time.

Further, the monitoring system 200 tracks motor torque (or handwheel torque) cycles to account for high stress usage. The monitoring system 200 also tracks temperature gradient cycles counting to identify transient thermal events in the steering system 40. The monitored cycles can be distinguished between high (shock) and low gradient.

The monitoring system 200 also computes an estimation of current usage based on a development validation cycle. The development validation cycle is a predetermined model for the usage of the one or more components of the steering system 40. The estimation is further based on mechanical position and load on the steering system 40. The monitoring system 200 also determines temperature of the controller 16 and/or motor 46 based on a temperature sensor. In one or more examples, the controller 16 can include a thermistor (not shown) for sensing temperature.

Alternatively, or in addition, the monitoring system 200 tracks use and life of the steering system 40 by using distance based cycle counting that is locally calculated in the steering system 40, for example based on time and vehicle speed. The distance and speed monitoring is further used to categorize vehicle use type, such as urban, residential, highway, and the like. The startup/ignition temperature monitoring is also used to determine native vehicle environment, such as polar, temperate, tropical, and the like. In one or more examples, this information is used to validate accuracy of the cycle counting. For example, if the part has met validation life but only registers as standard temperature or moderate temperature operating classification then there may be a conflict.

In the position based tracking, in one or more examples, the monitoring system 200 records a number of times the motor position in the steering system 40 goes above an upper threshold (deg_upper) and back below a lower threshold (deg_lower) in relation to a trimmed center position (in both positive and negative polarities). In one or more examples, each index of the counter is valued as a ½ count towards a complete cycle when either one of the thresholds is crossed.

Figure 4:
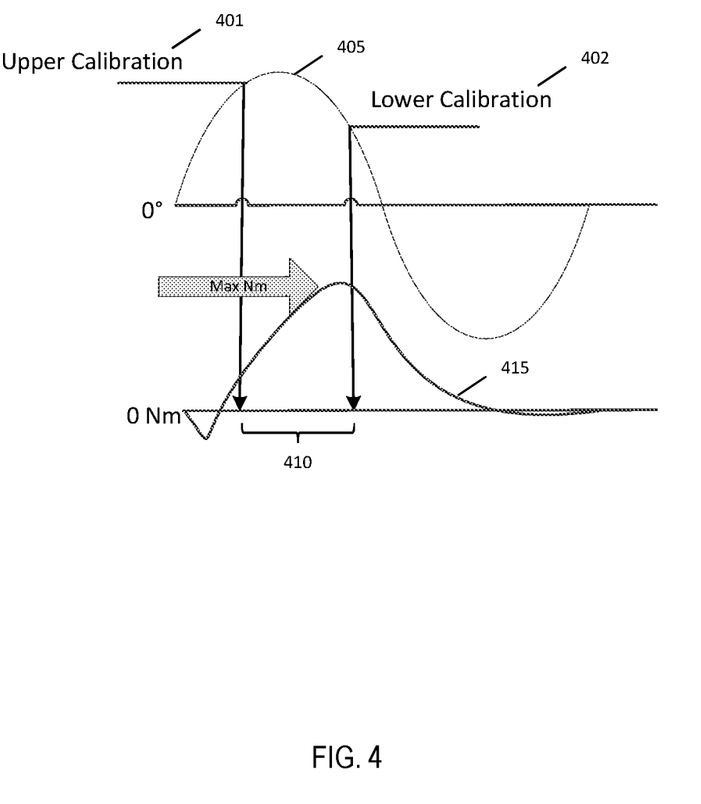
FIG. 4 depicts an example position based cycle counting with torque monitoring according to one or more embodiments.

FIG. 4 depicts an example position based cycle counting according to one or more embodiments. A motor position 405 is shown to change in a sinusoidal wave, however, it is understood that the motor position 405 can vary in any other regular/irregular pattern. Each time the motor position 405 crosses above the upper threshold 401 or crosses below the lower threshold 402, an index of a counter is incremented. The increment can be a ½ count in one or more examples, as described earlier. Any other increment value is possible, such as 1, 2, and the like.

The position based counting is separated into multiple usage types based on the frequency content (using a simple low pass filter) and the peak load measured between the upper and lower position cycle thresholds (401, 402). The peak load is defined as the total system torque equivalent of motor and handwheel torque.

A structure of the peak load measurement strategy is shown below in FIG. 4. The peak load 415 is measured during the duration 410, which is after the motor position 405 has crossed the upper threshold 401 and has yet to go below the lower threshold 402.

Figure 5:
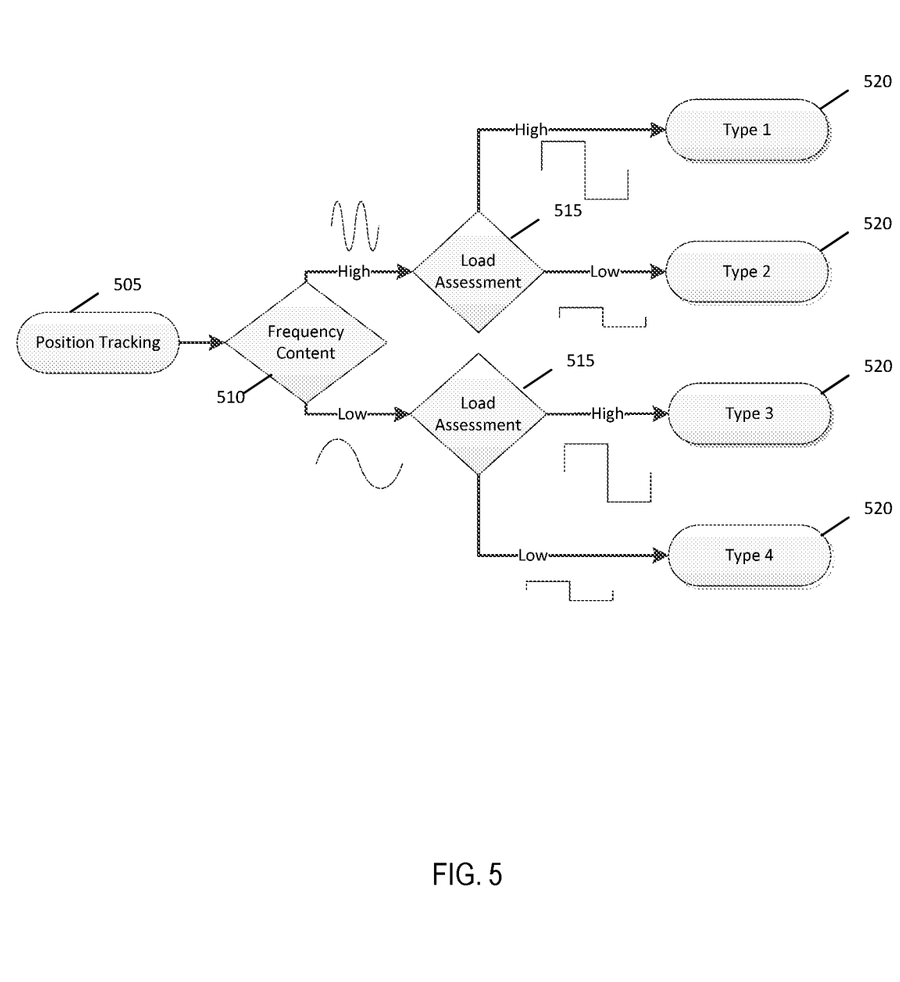
FIG. 5 depicts a flowchart an example method for using the position based cycle counting for categorizing the usage according to one or more embodiments.

FIG. 5 depicts a flowchart an example method for using the position based cycle counting for categorizing the usage according to one or more embodiments. Here, the categorization is done into four independent usage types. However, it is understood that different number and different usage types may be used for the categorization in other examples. The method includes position tracking (505) which includes incrementing the position counter index each time the threshold values (401, 402) are crossed by the change in the motor position 405. It should be noted that although FIG. 4 only depicts the threshold crossing in the positive polarity, the position counter index is similarly incremented when the motor position 405 crosses thresholds in the negative cycle of the motor position 405.

The frequency of the motor position change is computed based on the rate of change of the position counter index (510). The frequency content is also compared with predetermined frequency threshold values (510). If the position counter index changes at least at the rate equal to the predetermined frequency threshold, the frequency content can be labeled as 'high frequency', else as 'low frequency'. For example, 2 filter thresholds (510) are established and based on the frequency content of the position sensor the classification is in the top (high frequency) or bottom (low frequency).

In either case, the low frequency or the high frequency, the peak load 415 on the steering system 40 during the duration 410 is also assessed (515). If the peak load 415 is above a load threshold, the peak load 415 can be labeled as 'high load' and 'low load' otherwise. The peak load in this case can be the maximum value of motor torque during the position counting (FIG. 4). Accordingly, in this case, based on the frequency content and the peak load, the position tracking can be categorized into 4 categories (520) represented by one of low frequency —low load, low frequency—high load, high frequency—low load, and high frequency—high load, respectively.

The position based cycle counting can be used to describe the various wear and fatigue based tests that are used in validation test plans for mechanical system validation. During Development testing (DV), threshold calibration values are established, and actual cycle counts from DV testing are recorded. The counts from each category (520) are used to normalize the present running status of the steering system 40 (in counts) against the life counts (from the completion of DV). This facilitates a real-time estimation of use-life. Intermediate counts from each type are also available as outputs. DV cycles are typically correlated to a vehicle life in miles providing more detail about the system in question. An example formula used for real-time estimation of use-life (against DV) is shown below in equation 1, where N is the number of categories (N=4 in above example).

$$\% \text{ Use of life} = \frac{\sum_{1}^{N} \frac{\text{Type } i \text{ counts}}{\text{Type } i \text{ counts per } DV}}{N} \times 100. \quad \text{Eq (1)}$$

Alternatively, or in addition, instead of the position based cycle counting, torque based cycle counting can be used in a similar manner. In this case, the total system torque of motor and handwheel torque is used as an input rather than position. In other words, the same operations depicted in the flowchart of FIG. 5 can be followed, but, instead of incrementing the counter index based on a comparison of the motor position with upper and lower thresholds (401, 402), a comparison of the handwheel torque with the thresholds is used. The system peak load 415 is subsequently measured and used in the same manner as described above. This output is present to gauge high output usage systems vs low output usage systems. The use-life calculation of equation 1 can still be used. The DV counts are also based on the handwheel torque input.

According to one or more embodiments, a temperature gradient based cycle counting is used for determining use-life of the steering system 40. Temperature gradient based cycle counting uses a local measurement of ignition temperature when the vehicle 100 is started (switched ON). Temperature sensors 23 are located to measure the ignition temperature and to provide such a measurement to the monitoring system 200.

The temperature gradient based cycle tracking uses a rate of change [degC/s] of temperature rather than an absolute value (as was the case with position-based and torque-based). A high rate of temperature change (above a temperature-rate threshold) can strain one or more components of the steering system 40, such as a printed circuit board, an electronic circuit, or any other such component. The strain can be in a negative manner particularly if there is a design oversight with the coefficient of thermal expansion of materials.

Temperature gradient based cycles are sorted into two types based on the rate of change in temperature; each method using a rate calibration as described above and two threshold calibrations [degC_upper, degC_lower] to define one count.

Figure 6:
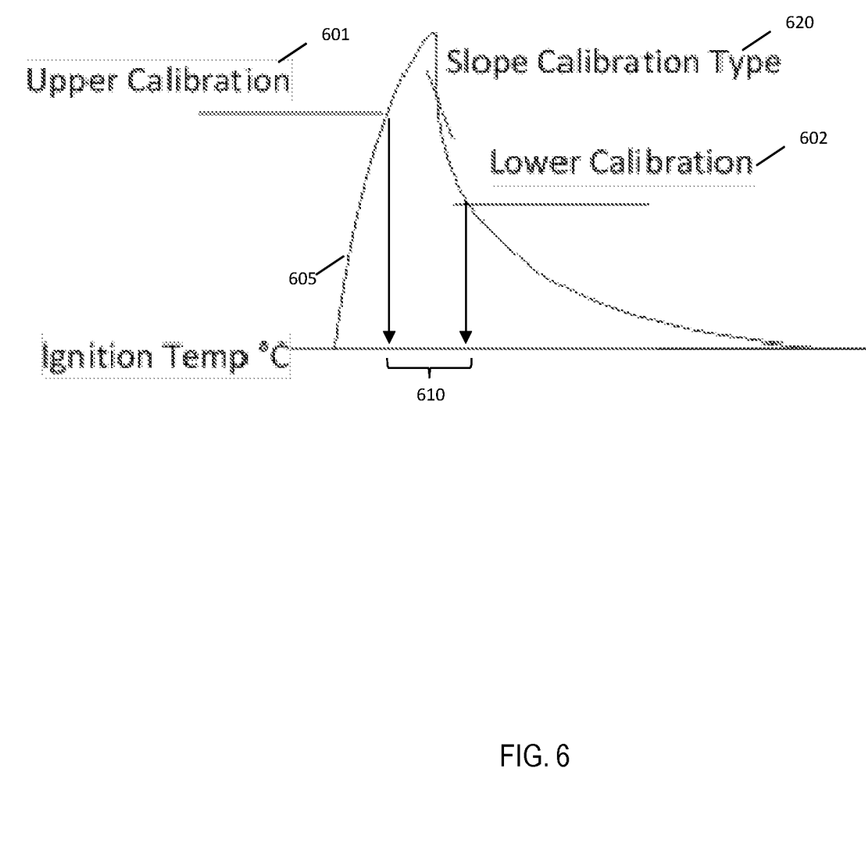
FIG. 6 depicts one count increment for a temperature gradient cycle according to one or more embodiments.

FIG. 6 depicts one count increment for a temperature gradient cycle according to one or more embodiments. The ignition temperature 605 measurement is compared with an upper temperature threshold 601 and a lower temperature threshold 602. A slope of the curve during a duration 610 is calculated, where the duration 610 represents when the ignition temperature 605 crosses the upper threshold 601 and decreases back to reach the lower threshold 602. Depending on the slope of the curve matching one or more slope calibration types 620 a type of the temperature gradient is selected and the corresponding counter is incremented. For example, the temperature gradients can be categorized into two cycles to distinguish between relatively extreme temperature shifts and mild temperature shifts over a given time. The extreme temperature shift can be represented by a calibrated slope 620 for a particular change in temperature per 10 minutes, while a mild temperature shift can be represented by a calibrated slope 620 for the particular change per 10 minutes, or any other such durations. It is understood that in other examples, more than two temperature gradient categories can be used using different slope calibration types 620.

Similar to position based counting, the electrical validation plans have tests to ensure immunity against thermal fatigues. Using techniques for normalization against the DV plan (similar to position based life calculations above) the temperature based cycle counting can be used to describe real-time estimation of use-life (based on thermal cycles). In one or more examples, the real-time estimation of use-life against DV using the thermal cycles is shown below in equation 2, where M is the number of counts of each matching slope.

$$\% \text{ Use of life} = \frac{\sum_{1}^{N} \frac{\text{Slope } i \text{ counts}}{\text{Slope } i \text{ counts per } DV}}{M} \times 100. \quad \text{Eq (2)}$$

Further, another life usage for automotive components is performed using mileage accumulation. DV test plans are frequently developed to validate vehicle systems (such as steering) based on an assumed mileage life. Distance monitoring enables the monitoring system 200 to calculate a real-time odometer measurement locally rather than relying on other vehicle sub-systems.

Alternatively, or in addition, the monitoring system 200 uses an odometer calculation performed by the steering system 40. Such odometer calculations are independent of other vehicle subsystems. The odometer calculation is performed using a vehicle speed input received via the CAN 265. An example calculation is shown below in equation 3.

$$\text{Distance traveled} = \text{Vehicle Speed} \times \text{Steering system ON time} \quad \text{Eq(3)}.$$

Such parameter monitoring facilitates bringing validity to the results of the position and/or temperature based use-life calculations described above. If correlation between vehicle's use-life counts and cycle counts don't match that of the validation plan, the results of the use-life estimations are invalidated.

Another indicator of use-life for automotive components is profiling vehicle use case, where such profiling indicates how the vehicle is being driven. Particularly, in case of the steering system 40 the vehicle 100 being used for urban driving vs highway driving can have completely different profiles of wearing the steering system 40 in substantially different manner.

Figure 7:
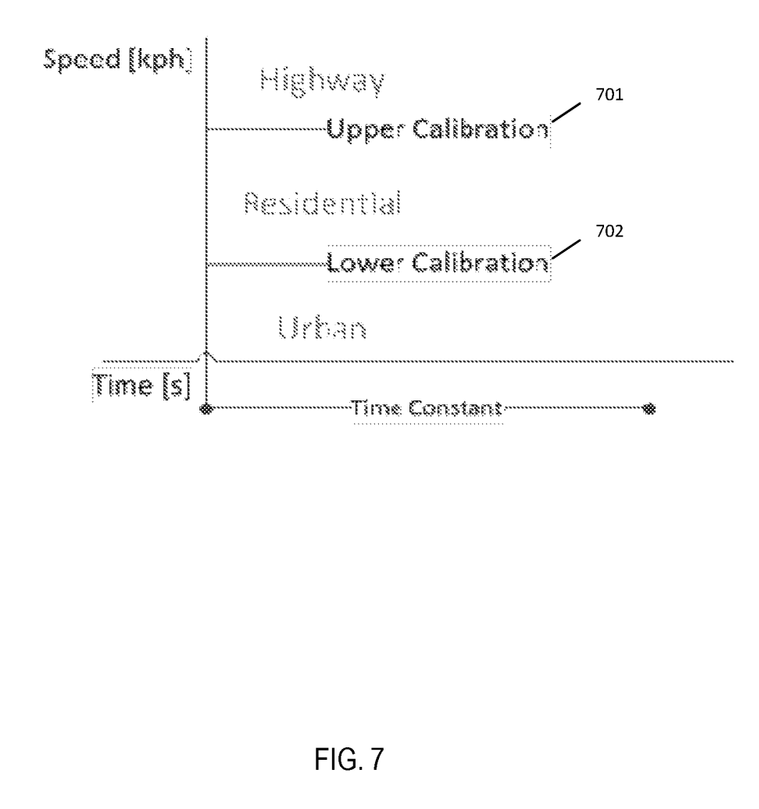
FIG. 7 depicts categorization of the vehicle use according to distance vs. speed monitoring according to one or more embodiments.

For example, Distance vs. Speed Monitoring can categorize the vehicle 100 use into 3 types: Urban, Residential and Highway. FIG. 7 depicts categorization of the vehicle use according to distance vs. speed monitoring according to one or more embodiments. In the illustrated example, upper thresholds 701 and lower speed thresholds 702 [kph_upper, kph_lower] are used to establish threshold ranges. High speed use correlates to highway driving, low speed use to Urban driving and a range between for Residential driving. In one or more examples, a predetermined time duration is used to ensure that the operation of the vehicle 100 remains in a certain category before counting usage in that range. Accordingly, for example, only when the vehicle 100 is used at a vehicle speed above the upper threshold 701 for at least the predetermined time duration (e.g. 5 seconds, 10 seconds, 3 minutes etc.) the counter for highway use of the vehicle 100 is incremented in this case. Counters for the other categories increment in a similar manner.

Another important indicator of use-life for automotive components is vehicle operating environment, external conditions where the vehicle being driven. Particularly, for the steering system 40, usage in extreme cold weather and usage in arid climate can have completely different impacts on thermal degradation and expected failure. Accordingly, the monitoring system 200 uses startup temperature to bucket/categorize the vehicle operating environment.

Figure 8:
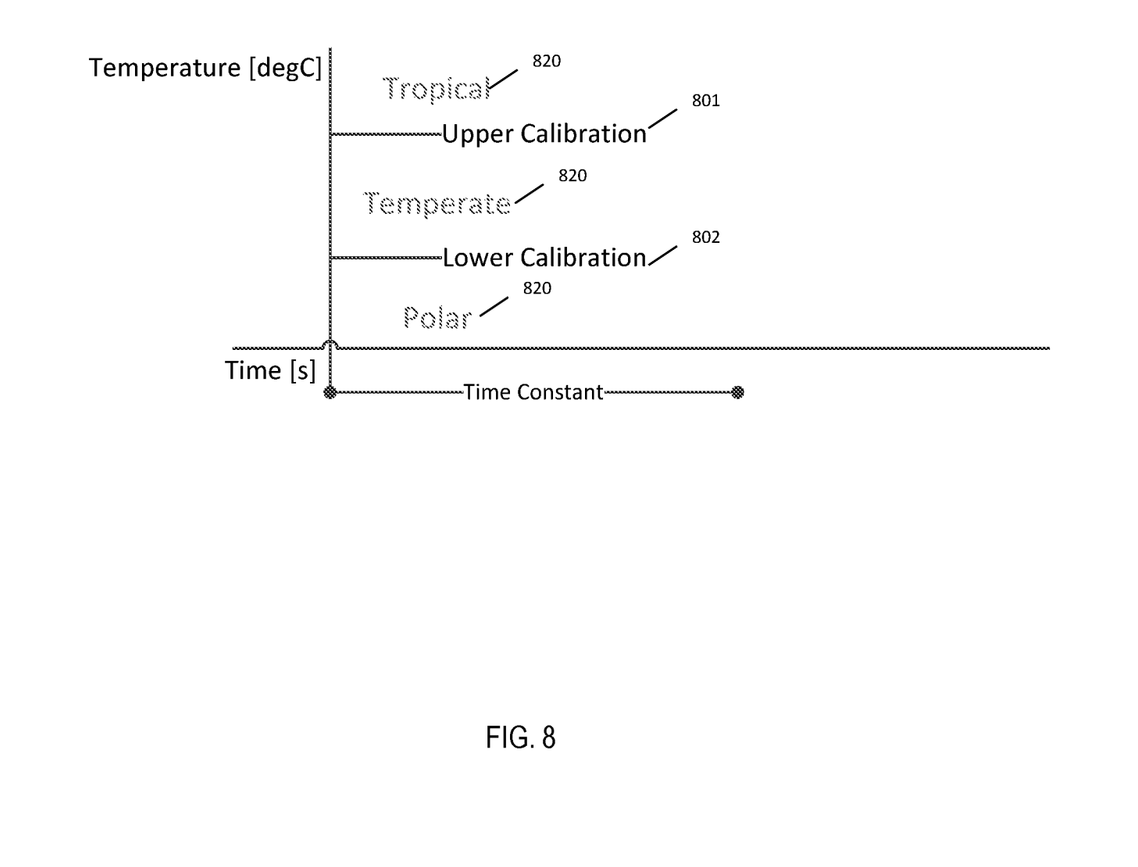
FIG. 8 depicts an example categorization of vehicle environment by the monitoring system according to one or more embodiments.

FIG. 8 depicts an example categorization of vehicle environment by the monitoring system according to one or more embodiments. In the depicted example, the vehicle environment is categorized into three types: Polar, Temperate and Tropical based on the initial temperature of the temperature sensor 23. It should be noted that different categorization is possible in other examples. Starting from the initial temperature ensures that the classification is valid and accurate.

The categorization (820) can be performed using an upper threshold 801 and a lower temperature threshold 802 (degC_upper, DegC_lower) to establish threshold ranges. High temperature threshold 801 can correlate to a tropical climate (820), and the low temperature threshold 802 to a polar climate (820), and a range between the two thresholds correlates to a temperate climate (820). A predetermined constant time duration is used to ensure that the initial temperature reading is that from a true startup rather than an ignition cycle. For a true startup, the initial temperature is expected to change toward a steady state operating temperature; if this change is not observed within a specific calibratable time constant, it is assumed that an ignition cycle has occurred rather than a startup cycle and the count towards a climate type is ignored.

Such additional information, like the vehicle environment that indicates climate in which the vehicle 100 is being used, vehicle use profile that indicates the typical use scenario of the vehicle 100, and distance for which the steering system 40 has been in use, can be used in conjunction with the count cycle based use-life calculation. The count cycle based use-life can be calculated using one or more attributes, such as the motor position, the temperature, and the like, as described herein. For example, the additional information can be used to scale the use-life that is calculated. For example, the use-life is multiplied by a scaling factor corresponding to the vehicle environment, the use profile, or both. Accordingly, a use-life (U) is adjusted to U*S, where S is the scaling factor. The scaling factor can increase or decrease the calculated use-life based on the vehicle environment and/or the use profile. In one or more examples, multiple scaling factors are used, one for the vehicle environment and one for the use profile.

Alternatively, the vehicle environment, and/or the use profile may indicate a non-linear calculation that is used to adjust the use-life that is computed. Accordingly, the adjusted use-life (AU) can be represented as AU=$f$(U, vehicle environment, use-profile), where $f$ is a non-linear function.

Further, in one or more examples, the vehicle environment, and/or the use profile can be used to select a set of the counts per DV that is used for computing the use life. For example, based on the vehicle 100 being used in a tropical climate the counts per DV used is different than those used for the vehicle 100 being used in a polar climate. Similarly, counts per DV for an urban use vehicle can be different than a highway use vehicle.

Figure 9:
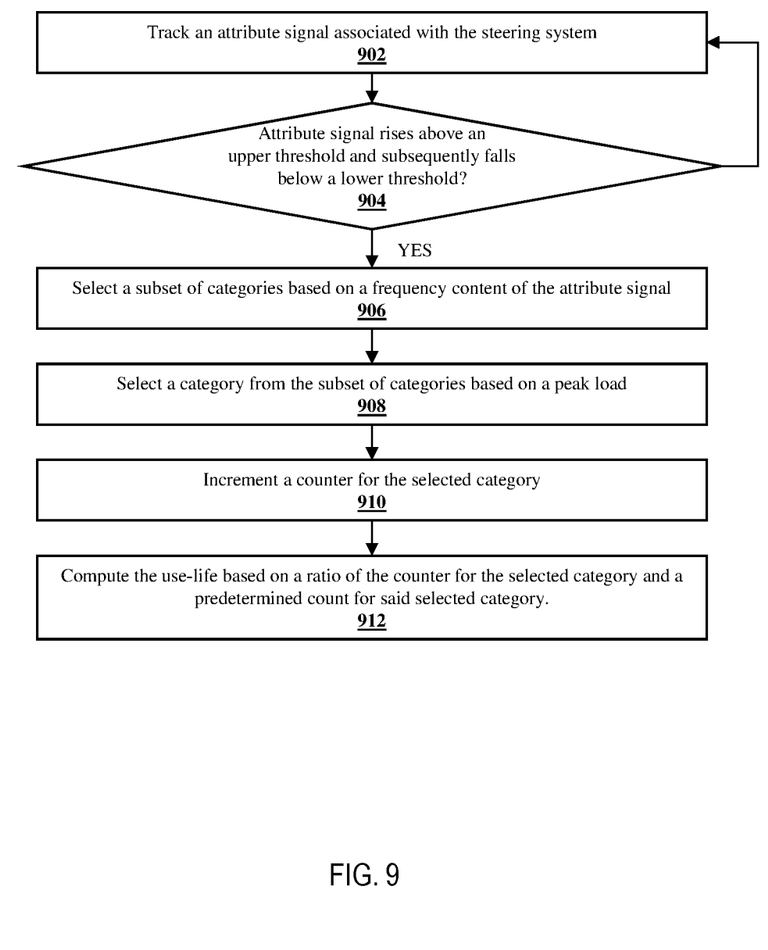
FIG. 9 illustrates a flowchart of an example method for real-time calculation of a use-life for the steering system according to one or more embodiments.

FIG. 9 illustrates a flowchart of an example method for real-time calculation of a use-life for the steering system according to one or more embodiments. The method includes tracking an attribute signal associated with the steering system 40 (902). The attribute signal can be the motor position, the temperature, the torque, and the like, as described herein. Further, the method includes determining whether the attribute signal rises above an upper threshold and subsequently falls below a lower threshold (904). The method further includes selecting a subset of categories based on a frequency content of the attribute signal (906). Further, the method includes selecting a category from the subset of categories based on a peak load (908).

For example, as described herein with respect to the motor position, among the four types of position-based categories, the frequency content eliminates (or selects) two categories, and the peak load facilitates selecting one of the two categories from the selected subset.

The method further includes incrementing a counter for the selected category (910). The method further includes computing the use-life based on a ratio of the counter for the selected category and a predetermined count for said selected category (912). The predetermined count for said selected category include the DV counts that are measured during the testing of the components. In one or more examples, the predetermined count that is used is based on other categorization performed, such as the use profile, the vehicle environment, and the like. As described herein, the use-life can be computed using the counts determined in this manner for all of the categories.

The technical solutions described herein accordingly facilitate determining an estimated use-life of a steering system in real time by monitoring one or more attribute signals received from one or more sensors. The estimated use-life can be adjusted based on determining a vehicle environment and vehicle use profile to improve the accuracy of the estimated use-life. Further, the determined use-life can be validated using a distance measurement that is specific to the steering system, rather than an odometer reading from the vehicle itself. As noted herein, the technical solutions described herein can be used with any type of steering systems, such as an EPS system, a SbW system, and the like.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. A steering system comprising:
a motor;
a controller configured to control the motor by sending at least one command signal based on at least one torque signal received from a torque sensor associated with a torsion bar of the steering system, wherein the motor, in response to receiving the at least one command signal, supplies an assist torque to the steering system through a worm and a worm gear, to assist in vehicle steering; and
a monitoring system that comprises at least a memory device and a processor, the monitoring system coupled with the controller, the monitoring system configured to determine, in real time, a use-life of the steering system, determining the use-life comprising:
receiving an attribute signal;
based on a determination that the attribute signal rises above an upper threshold and subsequently falls below a lower threshold, wherein the attribute signal includes the at least one torque signal:
selecting a subset of categories based on a frequency content of the attribute signal;
selecting, based on a second attribute signal, a category from the subset of categories, wherein the second attribute signal indicates a peak load occurring in sequence with the attribute signal; and
incrementing a counter for the selected category; and
computing the use-life based on a ratio of the counter for the selected category and a predetermined count for said selected category.

2. The steering system of claim 1, wherein the monitoring system is further configured to notify an operator of the use-life that is computed using the attribute signal.

3. The steering system of claim 1, wherein the use-life computation is performed using:

$$\% \text{ Use of life} = \frac{\sum_{1}^{N} \frac{\text{Type } i \text{ counts}}{\text{Predetermined Type } i \text{ counts}}}{N},$$

where N is the number of categories, and Type i counts are the count for the category i and are a function of an intended design life of the steering system.

4. The steering system of claim 3, wherein the attribute signal is a motor position signal, and the secondary attribute signal is a torque signal.

5. The steering system of claim 3, wherein the monitoring system is further configured to:
  determine an operating environment of the steering system based on a startup temperature.

6. The steering system of claim 3, wherein the monitoring system is further configured to:
  determine an operating profile of the steering system based on a vehicle speed classification.

7. The steering system of claim 1, wherein the monitoring system is further configured to validate the use-life that is computed based on a distance for which the steering system has been used.

8. A method to determine, in real time, a use-life of a steering system, the method comprising:
  controlling a motor of a steering system by sending at least one command signal based on at least one torque signal received from a torque sensor associated with a torsion bar of the steering system, wherein the motor, in response to receiving the at least one command signal, supplies an assist torque to the steering system through a worm and a worm gear, to assist in vehicle steering;
  tracking an attribute signal associated with the steering system, wherein the attribute signal includes the at least one torque signal;
  based on a determination that the attribute signal rises above an upper threshold and subsequently falls below a lower threshold:
    selecting a subset of categories based on a frequency content of the attribute signal;
    selecting, based on a second attribute signal, a category from the subset of categories, wherein the second attribute signal indicates a peak load occurring in sequence with the attribute signal; and
    incrementing a counter for the selected category; and
  computing the use-life based on a ratio of the counter for the selected category and a predetermined count for said selected category.

9. The method of claim 8, wherein the use-life computation is performed using:

$$\% \text{ Use of life} = \frac{\sum_{1}^{N} \frac{\text{Type } i \text{ counts}}{\text{Predetermined Type } i \text{ counts}}}{N},$$

where N is the number of categories, and Type i counts are the count for the category i and are a function of an intended design life of the steering system.

10. The method of claim 9, wherein the attribute signal is a motor position signal, and the secondary attribute signal is a torque signal.

11. The method of claim 9, further comprising:
  determining an operating environment of the steering system based on a startup temperature.

12. The method of claim 9, further comprising:
  determining an operation profile of the steering system based on a vehicle speed classification.

\* \* \* \* \*